United States Patent [19]

Schwarz

[11] 4,310,862

[45] Jan. 12, 1982

[54] MAGNETIC CONTROL STRIP RECORDING DEVICE FOR ROADWAY CONTROL SYSTEM

[76] Inventor: Alfred V. Schwarz, P.O. Box 425, Winnipeg, Manitoba, Canada, R3C 2H6

[21] Appl. No.: 88,604

[22] Filed: Oct. 26, 1979

Related U.S. Application Data

[63] Continuation-in-part of Ser. No. 65,084, Aug. 9, 1979, abandoned.

[51] Int. Cl.³ .............................. G11B 5/02; G11B 5/00
[52] U.S. Cl. .................................... 360/68; 360/1; 360/137
[58] Field of Search ................ 360/1, 137, 68, 61, 360/46

[56] References Cited

U.S. PATENT DOCUMENTS

| | | | |
|---|---|---|---|
| 3,085,646 | 4/1963 | Paufve | 180/82.1 |
| 3,233,246 | 1/1966 | Jensen | 360/68 |
| 3,267,446 | 8/1966 | Moore, Jr. | 360/46 |
| 3,431,996 | 3/1969 | Giles et al. | 180/98 |
| 3,438,054 | 4/1969 | Wisner | 360/46 |
| 3,556,244 | 1/1971 | Gray | 180/98 |
| 3,564,523 | 2/1971 | Cavelos et al. | 360/1 |
| 3,575,255 | 4/1971 | Wickstrom | 180/98 |
| 3,609,678 | 9/1971 | Fayling | 340/32 |
| 3,653,456 | 4/1972 | Uemura | 180/98 |
| 3,669,208 | 6/1972 | Brooke | 180/98 |
| 3,837,756 | 9/1974 | Schwarz | 404/70 |
| 3,864,731 | 2/1975 | Callahan | 360/5 |
| 4,003,445 | 1/1977 | De Bruine | 180/98 |
| 4,214,481 | 7/1980 | Ruetlinger | 360/1 |

FOREIGN PATENT DOCUMENTS 1237728  6/1971  United Kingdom ............... 360/1

OTHER PUBLICATIONS

"Australian Trading News"—Journal of the Australian Trade Comissioners—Canada, 1/77.
"Machine Constructs Kerbs, Gutters & Channels'-'—Unindentified Printed Publication.
Photocopy of a Photograph Showing a GEMCO Curb Laying Machine.

*Primary Examiner*—Vincent P. Canney
*Attorney, Agent, or Firm*—Merchant, Gould, Smith, Edell, Welter & Schmidt

[57] ABSTRACT

A magnetic control strip recording device for vehicle control systems. A paving machine (12) lays a strip (10) containing magnetizable material. A wheel (30) rotates in response to the movement of machine (12). Magnets (34), (36) on the wheel and reed switches (38), (40) adjacent the wheel are activated in response to the movement of the wheel. An electromagnet (21) is energized when the reed switches (38), (40) are closed creating a magnetic pattern in the strip (10) of magnetized zones having alternating polarities for adjacent zones. An alternative magnetic pattern may also be produced by opening the optional disabling switch (44). The switches (38, 40) are preferably capacitively coupled to the electromagnet (21) to prevent undue drain on the power supply should the wheel (30) be stopped with one of the switches (38, 40) closed.

18 Claims, 8 Drawing Figures

MAGNETIC CONTROL STRIP RECORDING DEVICE FOR ROADWAY CONTROL SYSTEM

The present application is a continuation-in-part of application Ser. No. 065,084 entitled "Magnetic Control Strip Recording Device for Roadway Control System" filed Aug. 9, 1979 now abandoned.

TECHNICAL FIELD

The present invention relates to means for impressing a magnetic pattern in a road surface for use in motor vehicle guidance or speed monitoring or control systems.

BACKGROUND OF THE INVENTION

Numerous systems have been devised for vehicle guidance which range from fully automatic steering or speed control to merely providing roadway information to the driver such as an electronic warning of upcoming road conditions such as a difficult curve, etc. Many of them involve the implantation of magnetic strips into a road surface such as U.S. Pat. No. 3,085,646 issued to Paufve and U.S. Pat. No. 3,575,255 issued to Wickstrom for automatic speed and directional control of a vehicle. A number of other related systems are cited in U.S. Pat. No. 4,003,445 issued to De Bruine. My U.S. Pat. No. 3,837,756 discloses mixing ferric particles and optically reflective material with concrete to produce a magnetizable road surface.

Although systems have been proposed for vehicle guidance using magnetic fields within the road surface, there exists a need for an inexpensive and simple means for impressing a magnetic field onto a road surface and a means to alter the magnetic field at a future time without tearing up the roadway. In addition, a simple means for producing an alternative magnetic field pattern in the roadway to signal a change in the vehicle speed limit due to changing road conditions such as curves, urban congestion or road construction ahead is needed.

The present invention provides means for impressing a plurality of magnetic field patterns into magnetizable road surfaces material while or after it has been laid and provides a simple means for altering the magnetic pattern at any time in the future.

SUMMARY OF THE INVENTION

The present invention provides an apparatus for impressing a magnetic pattern into a magnetizable road surface material for use by systems for guidance of vehicles using the roadway. The apparatus, which may be attached to a road surface laying machine, may include an electromagnet, a member attached to the laying machine at one end and the magnet at the other end for positioning the magnet adjacent the magnetizable road surface, means for detecting the movement of the laying machine along the road and energizing the magnet at periodic points along the road surface in order to impress a magnetic field pattern therein. Means may also be provided to limit the length of time the coil is energized. This will prevent undue drain on the power supply should the machine be held in place with the coil energized.

According to another aspect of the invention there is provided a switch to alter the magnetic field produced in the electromagnet from alternating polarities to like polarities. According to a further aspect of the invention, the apparatus for impressing the magnetic patterns may be connected to a mobile body other than the above-mentioned roadway laying machine to permit magnetizing or remagnetizing of such a magnetizable road surface.

BRIEF DESCRIPTION OF THE DRAWINGS

Referring to the drawings, wherein like numerals indicate like elements.

DETAILED DESCRIPTION OF THE DRAWINGS

Figure 1:
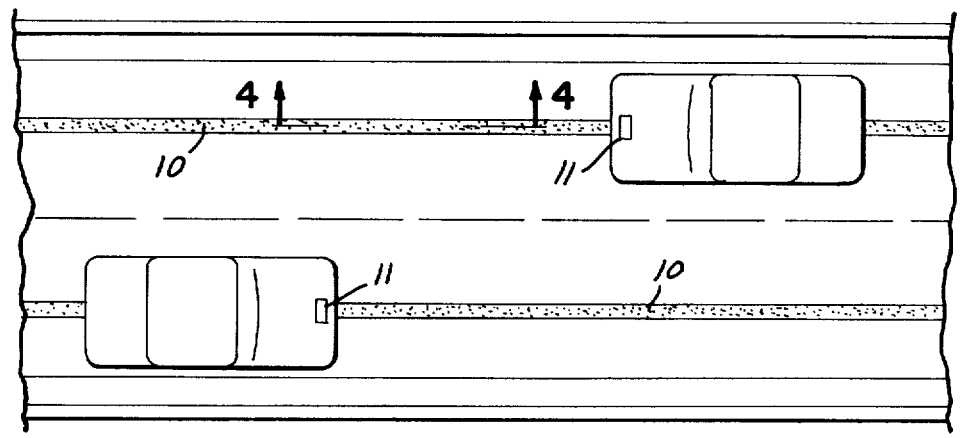
FIG. 1 is a top view of a two lane highway having a magnetic control strip running down the center of each lane.

Referring to the drawings in detail, there is shown in FIG. 1 a two lane roadway having a pair of vehicles traveling in opposite directions with a strip 10 of magnetized road surface material in the center of each lane. The vehicles passing over strip 10 may contain sensing devices 11 capable of detecting the magnetic fields of strip 10. The sensors may be coupled to systems as proposed in the prior art to provide automatic steering and speed control or to provide a visual or audible warning to the driver of road conditions ahead.

Figure 2:
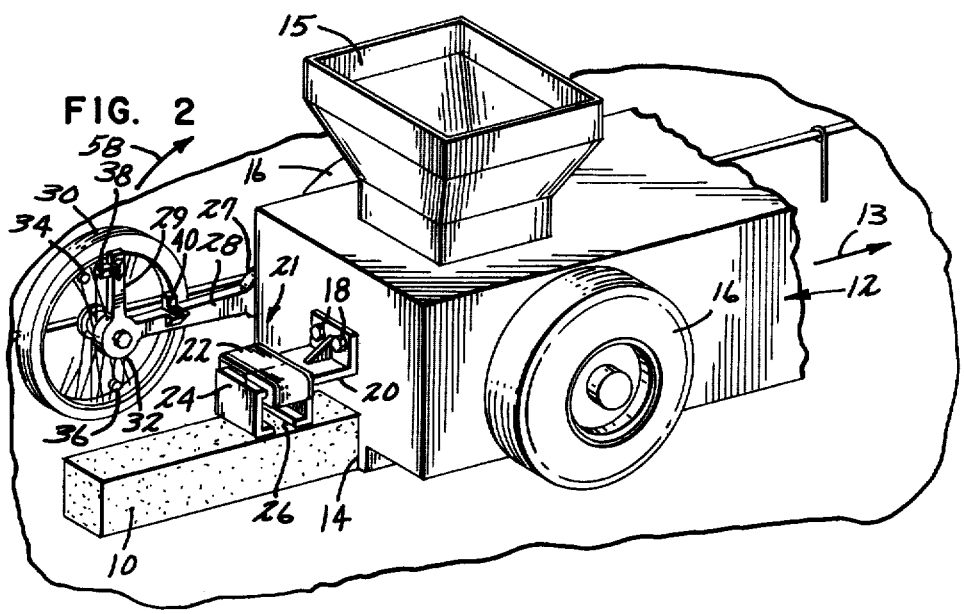
FIG. 2 is a perspective view of a road surface laying machine for laying a magnetic strip on a road bed including a device for impressing magnetic patterns in the strip according to the present invention.

The perspective view of FIG. 2 shows the structure of strip 10 and the equipment for laying and magnetizing the strip. In the proposed embodiment, strip 10 is laid by a slip-form laying machine 12 which extrudes the strip 10 through a mold 14 in a continuous fashion as it is moved along the road bed. Such laying machines are well known in the prior art, but without the magnetizing apparatus, and are routinely employed in the construction of street curbing and median dividers. Concrete in a "plastic" state is poured into hopper 15 and extrudes a strip 10 as it moves along the road bed on wheels 16 in the direction indicated by arrow 13. In order to make the concrete magnetizable, it is mixed with ferric or other magnetic materials such as powdered iron while the concrete is still in this plastic state. My U.S. Pat. No. 3,837,756 discloses one such mixture. It should be understood that strip 10 is preferably laid on a graded road bed prior to the application of concrete or asphalt mat for the main part of the road surface. It would of course also be possible to cut a channel in the existing road surface and install strip 10 into that channel.

Figure 3:
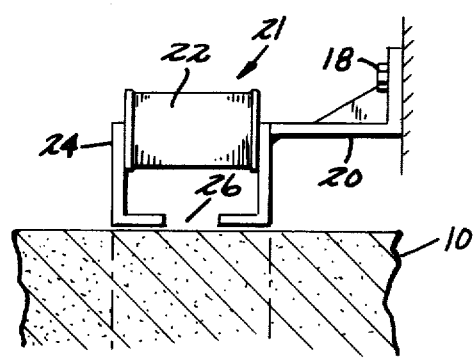
FIG. 3 is an enlarged side view of the device of FIG. 2 for impressing magnetic patterns in the road surface material.

Referring to FIGS. 2 and 3, laying machine 12 is shown laying strip 10. Electromagnet 21 is shown proximate strip 10 for impressing magnetic fields into the strip. Electromagnet 21 consists of coil 22 and core 24 with a gap 26 in the core. Permeable core 24 extends through coil 22, downward and then parallel with the ground forming gap 26. Core 24 directs the intense magnetic lines of force to gap 26, which is positioned adjacent strip 10. When coil 22 is energized, a magnetic field is impressed into the ferric materials within strip 10. Electromagnet 21 may be attached to machine 12 by any suitable mounting such as bracket 20 which itself is affixed to machine 12 by bolts 18.

A distance wheel 30 rotates in response to the movement of machine 12 in order to energize coil 22 as will hereinafter be described. Located near the outer perimeter of wheel 30 are permanent magnets 34 and 36 placed 180 degrees apart from each other on the wheel. A pivot arm 28 is attached to machine 12 at pivot point 27. Attached to pivot arm 28 at hub 32 is secondary arm 29 held at a right angle to pivot arm 28. On pivot arm 28 and secondary arm 29 are located magnetic reed switches 38 and 40, positioned such that when wheel 30 is rotated permanent magnets 34 and 36 will pass proximate reed switches 38 and 40. Reed switches 38 and 40 control the energization of coil 22. It is understood that other switch systems such as optical or mechanical switches may be substituted for the reed switches 38 and 40 and permanent magnets 34 and 36.

Figure 8:
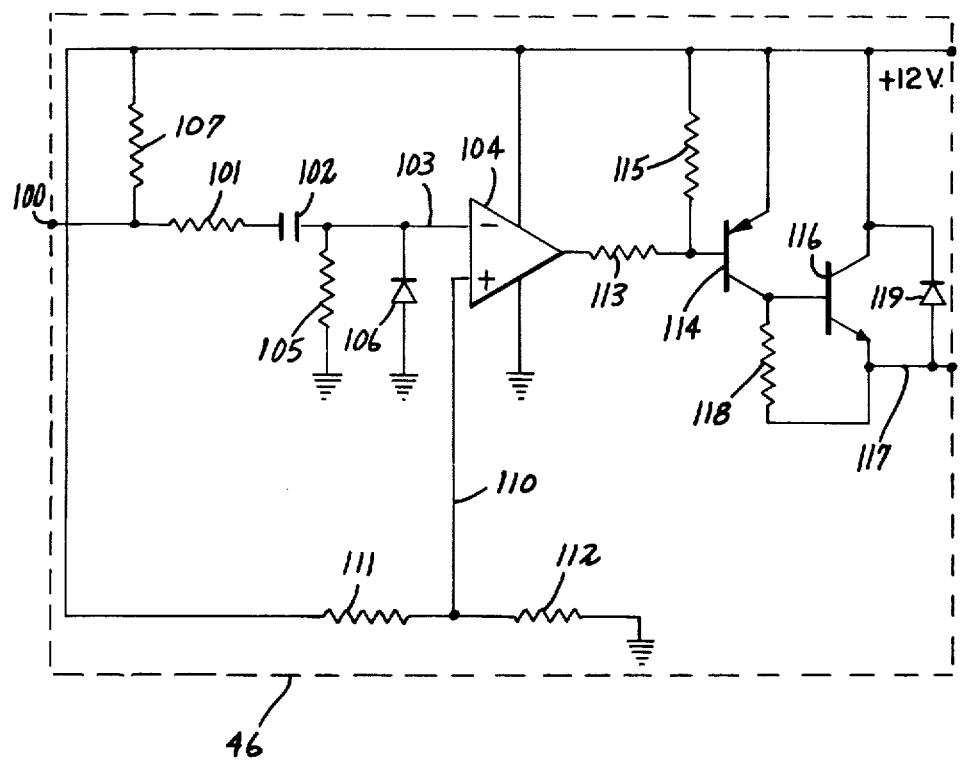
FIG. 8 is a schematic circuit diagram of a circuit employed in the preferred embodiment of the invention.

Magnetic reed switches 38, 40 may be either directly or indirectly connected to coil 22. If directly connected through a battery, these switches must be large enough to carry the heavy current drawn by coil 22. It is preferable to use circuitry shown in FIG. 6 generally designated by the numeral 42. Circuit 42 is a diagrammatic illustration of circuitry which indirectly connects switches 38 to 40 to coil 22. This circuit employs a pair of current amplifiers 46 and 47 which may consist of solid state devices or mechanical relays to reduce the current load on the reed switches yet provide sufficient current for coil 22. In the preferred embodiment the circuitry shown in FIG. 8 is employed. In order to prevent undue drain on the power supply which might occur if wheel 30 were stopped indefinitely at a point where switch 38 or 40 was closed, the capacitively coupled amplifier of FIG. 8 can be used which will limit the length of time coil 22 will be energized with each opening and closing of switch 38 or 40. Details of the operation of this circuit are described in the "Operation of the Invention" section below.

Figure 7:
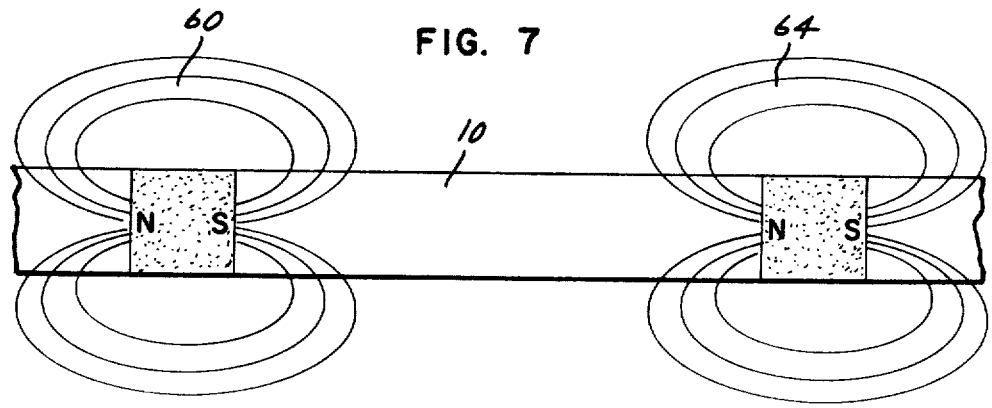
FIG. 7 is a diagrammatic side view of the magnetized road material as seen in the direction of arrows 4—4 of FIG. 1 showing an alternate magnetic pattern and field lines.

Referring now to FIG. 8, there is shown a schematic diagram of a preferred amplifier circuit for use as amplifiers 46 and 47 of FIG. 7, it being understood that two such circuits, only one of which is shown, would be required. Input 100 in practice is connected to switch 38 of FIGS. 7, assuming that the amplifier of FIG. 8 is to be used as amplifier 46 of that FIGURE. Input 100 connects through a resistor 101 and a series capacitor 102 to a lead 103 which connects to the inverting input of an operational amplifier 104. Also connected to lead 103 is a resistor 105 whose other end connects to signal ground. A diode 106 is connected with its anode to signal ground and its cathode to lead 103. A biasing resistor 107 connects from the input lead 100 to the positive 12 volt supply for the amplifier (not shown) which could be any known power supply, such as a battery for the laying machine 12.

The noninverting input of amplifier 104 connects by means of a lead 110 to the mid point of a voltage divider consisting of series connected resistors 111 and 112 which are connected between the plus voltage supply and signal ground. Suitable power and ground connections to the amplifier are provided as is generally known.

The output of amplifier 104 connects through a series connected resistor 113 to the base of a PNP transistor 114. A biasing resistor 115 connects from the positive power supply to the base of the transistor also. The emitter of transistor 114 is connected to the positive power supply, and its collector is connected to the base of a NPN transistor 116. The collector of transistor 116 connects to the positive voltage supply, and its emitter connects to lead 117, which is the output for the amplifier circuit of FIG. 8. The collector of transistor 114 also connects through a resistor 118 to output lead 117. A diode 119 is connected between collector and emitter of transistor 116 as shown for transient voltage protection for the transistor during switching of the inductive load of the magnetizing coil.

Output lead 117 would connect to lead 41, for the use of the circuit of FIG. 8 as amplifier 46 of FIG. 7, or to lead 43 if used as amplifier 47.

Figure 6:
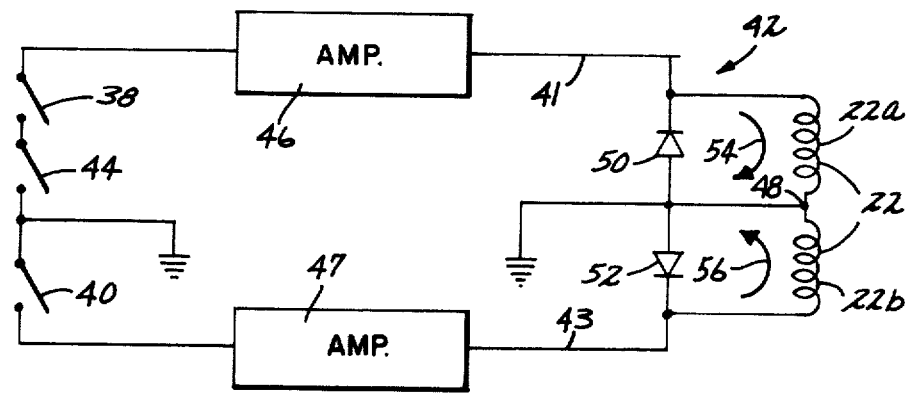
FIG. 6 is a schematic circuit showing the circuitry which provides current to the electromagnetic coil.

As shown in FIG. 6, one side of switch 38 is connected to one side of an optional disabling switch 44, whose function will hereinafter be described. The other side of switch 44 is connected to one end of switch 40 and ground. The other side of switch 38 is connected to the above described current amplifier 46. The remaining end of switch 40 is connected to current amplifier 47. Coil 22 has a grounded tap 48 which divides the coil into two branches designated 22a and 22b on either side of the tap. The output of amplifier 46 is connected to one end of coil 22a through the lead 41. The output at amplifier 47 is connected to the end of coil 22b through lead 43. Current flows in coils 22a and 22b when their respective amplifiers are energized, as indicated by arrows 54 and 56 respectively. Diodes 50 and 52 are connected with anodes grounded and cathodes connected to the outer taps of coil 22. The diodes serve to suppress unwanted switching transients.

OPERATION OF THE INVENTION

As laying machine 12 moves along the ground it deposits strip 10 containing magnetizable material. Simultaneously, wheel 30 rotates in response to the movement of the machine. At one half turn intervals of wheel 30 magnet 34 or 36 will pass proximate reed switch 38. In one embodiment of the invention if optional disabling switch 44 is closed, switch 38 will close, activating amplifier 46, which in turn sends a current into coil 22a, as indicated by arrow 54, thereby impressing a magnetic field of a first polarity in strip 10. As the machine continues to travel, the coil will be de-energized when the permanent magnet passes sowewhat beyond reed switch 38. Approximately one quarter revolution of wheel 30 later, that same permanent magnet will be proximate reed switch 40. Switch 40 will then be activated, activating amplifier 47, which in turn sends a current into coil 22b as indicated by arrow 56, thereby energizing electromagnet 21 with a polarity opposite that of the polarity established by closing switch 38.

In the preferred embodiment of the invention employing the circuit of FIG. 8, the operation is altered. As in the previous embodiment, the amplifier serves to energize coil 22A at the proper intervals as determined by the wheel 30 and its associated switch 38. However, in the preferred embodiment, the circuitry of FIG. 8 determines the time duration of the output magnetizing current as follows.

With switch 38 open, representing the condition of the magnetizing apparatus between marking intervals, the voltage at lead 103 is lower than the reference voltage established at lead 110, causing amplifier 104 to have a high voltage output which maintains transistors 114 and 116 off. In this condition, no current flows through coil 22A. As the wheel rotates and the magnet 34 or 36 causes switch 38 to close, capacitor 102 is charged through diode 106. Continued turning of the wheel causes switch 38 to open, and the charge on capacitor 102 causes amplifier 104 to change states to produce a low voltage output which in turn turns on transistors 114 and 116. In this condition magnetizing current flows through coil 22A as indicated by arrow 54 of FIG. 7.

Current remains flowing for a time period determined by the RC time constant determined by capacitor 102 and resistor 105. As capacitor 102 discharges through resistor 105 the voltage at lead 103 eventually drops below the reference voltage at lead 110, causing amplifier 104 to return to its initial state, turning off resistors 114 and 116, and terminating the flow of magnetizing current to coil 22A.

In practice, the values of capacitor 102 and resistor 106 are selected to provide the desired pulse width to give the desired length of magnetized zone in the magnetic strip. The choice of values for the capacitor and resistors can be easily determined by a person skilled in the art.

The circuit of FIG. 8 provides the additional advantage of preventing unwanted drain on the battery or power supply in case the paving machine stops with one of the switches 38 or 40 in a closed position. Since the closing of the switch does not itself cause current to flow through coil 22, no excess power supply drain will occur. As pointed out above, since supplying magnetizing current to the coil occurs only upon opening of the switch, and then only for a predetermined time interval, regardless of whether the wheel is moving or stopped, current will flow in the coil only for this predetermined interval.

Figure 4:
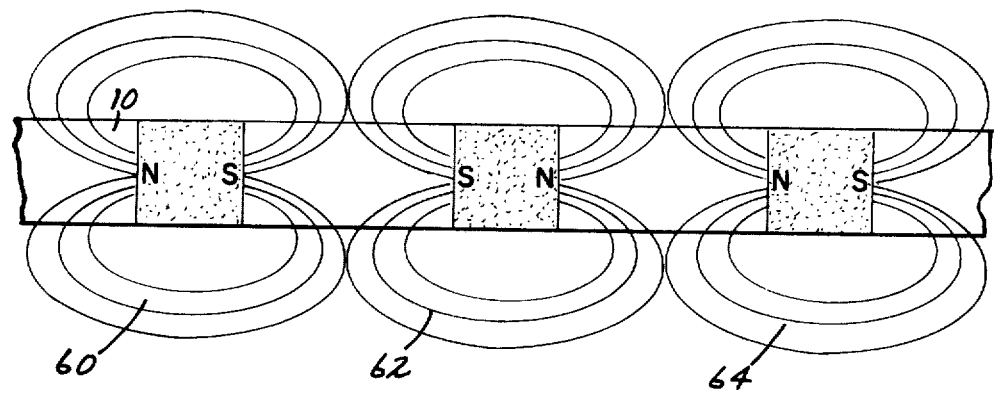
FIG. 4 is a diagrammatic side view of the magnetized road material showing a magnetic pattern and field lines as seen in the direction of arrows 4—4 of FIG. 1 to a larger scale.

The flow of current illustrated in FIG. 6 by arrows 54 and 56 shows the opposite current flows resulting from closure of switch 38 and 40 respectively. These opposite current flows create magnetic fields of opposing polarity. Every subsequent quarter turn of wheel 30 produces a magnetic zone of opposite polarity in strip 10. FIG. 4 illustrates strip 10 showing the approximate location of magnetic fields emanating from the magnetized zones which have been impressed into the strip as described above when optional disabling switch 44 is closed. Fields 60, 62 and 64 emanate from successive magnetic zones impressed into strip 10. The zones are polarized such that like poles of adjacent fields are located adjacent each other so that they tend to repel, causing field lines to extend above and below the surface of the road between adjacent magnetized zones.

Figure 5:
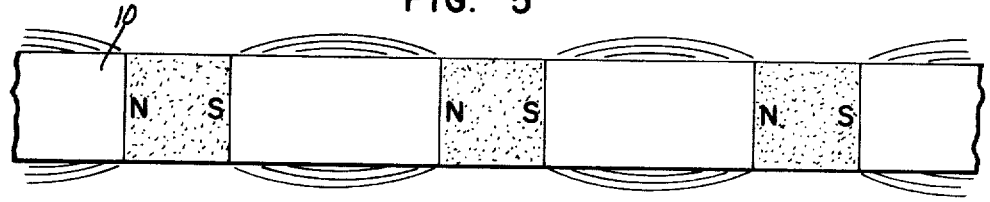
FIG. 5 is a diagrammatic side view of the magnetic material of FIG. 4 showing a magnetic pattern and field lines.

It is an important feature of this invention that adjacent magnetized zones of strip 10 have opposing polarities. By reversing the polarity of the field, the magnetic lines of flux are forced upward and downward as they extend around the magnetized zones, rather than coupling to adjacent zones. By forcing the field lines upward, the field strength above the road will be substantially enhanced for easier reception by a magnetic sensor on a vehicle passing thereover. If the spacing of the impressed magnetic field in strip 10 remained unchanged but the polarities of the zones were all the same so that the fields would appear as shown in FIG. 5, the lines of flux would couple toward neighboring magnetic fields, with little magnetic energy rising above the road surface.

An alternative magnetic pattern may be impressed in the road surface by opening optional disabling switch 44 which completely disables reed switch 38 and associate circuitry. The resulting magnetic pattern impressed in strip 10 is shown in FIG. 7. As wheel 30 turns, it is activated when permanent magnet 34 or 36 is proximate reed switch 40, this occurs every half turn of the wheel. Since switch 38 is disabled, only switch 40 is activated, and therefore the impressed magnetic field is always of the same polarity. The pattern produced having fields 60 and 64 impressed into the strip as shown in FIG. 4 is substantially identical to the pattern shown in FIG. 4 with the exception that field 62 is deleted. The problem of getting magnetic lines of force to extend above the road surface is not a significant consideration in this alternate pattern since the spacing between impressed magnetic zones in this pattern is twice that of the pattern shown in FIG. 4. With this increased spacing, the individual magnetic fields tend to remain isolated from each other, and the lines of force extend upward and downward around the zone. When it is desirable to disable the magnetizing feature of this invention, power may be disconnected from the batteries. Alternatively, pivot arm 28 may be pivoted on pivot point 27 so that wheel 30 is lifted in the direction of arrow 58. Means may be provided for holding wheel 30 off the ground thus disabling the magnetizing circuitry.

From the above description, it can be appreciated that the present invention is a magnetic control strip recording device designed to be used with a vehicle control system which enables a vehicle to be automatically or semi-automatically controlled while traveling. This invention provides inexpensive means for magnetizing a magnetic strip as it is laid or at any time thereafter and a means for changing the polarity and spacing of the magnetic pattern within the strip in order to change the nature of the control signals to be detected by a vehicle passing thereover. It also provides a means for strengthening the magnetic field above the road surface by employing a pattern of alternating magnetic polarities to improve detectability of the fields by a vehicle-mounted sensor.

Numerous characteristics and advantages of the invention have been set forth in the foregoing description, together with the details of the structure and function of the invention, the novel features thereof are pointed out in the appended claims. The disclosure, however, is illustrative only, and changes may be made in detail, especially in matters of shape, size, and arrangement of parts, within the principle of the invention, to the full extent intended by the broad general meaning of the terms in which the appended claims are expressed.

What is claimed is:

1. Apparatus for impressing a magnetic pattern into a magnetizable road surface material deposited by road surface laying equipment and for use in the control of vehicles passing thereover comprising:
    (a) a magnetic core;
    (b) means attached to said equipment for holding said core proximate said material;

(c) an electromagnetic coil proximate said core and operable when energized for inducing a magnetic field through said core;
(d) a wheel for rotating in response to movement of said equipment along the ground;
(e) means securing said wheel to said equipment; and
(f) switching means operatively associated with said wheel and responsive to the rotation thereof to establish alternating magnetic fields in said coil at periodic points in said movement to impress a magnetic pattern in said road material.

2. Apparatus for impressing a magnetic pattern into a magnetizable road surface material deposited by road surface laying equipment and for use in the control of vehicles passing thereover comprising:
(a) a magnetic core;
(b) means attached to said equipment for holding said core proximate said material;
(c) an electomagnetic coil proximate said core and operable when energized for inducing a magnetic field through said core;
(d) a wheel for rotating in response to movement of said equipment along the ground;
(e) means securing said wheel to said equipment; and
(f) first and second switching means operatively associated with said wheel and operatively connected to alternately establish magnetic fields of a first magnetic polarity and second opposite magnetic polarity respectively in said coil at periodic points in said movement to impress alternating magnetic patterns in said road material.

3. Apparatus of claim 2 including means for optionally disabling said second switching means whereby one of two different magnetic patterns can be impressed in said material.

4. Apparatus according to claim 2 wherein said first and second switching means include means for limiting the length of time said coil remains energized after being energized.

5. Apparatus according to claim 4 wherein said limiting means includes first and second switches and first and second amplifiers capacitively coupled to said switches.

6. Apparatus for impressing a magnetic pattern into a magnetizable road surface material and for use in the control of vehicles passing thereover comprising:
(a) mobile body means for transporting said apparatus along said road surface;
(b) a magnetic core;
(c) means attached to said mobile means for holding said core proximate said material;
(d) an electromagnetic coil proximate said core and operable when energized for inducing a magnetic field through said core;
(e) a wheel for rotating in response to movement of said mobile means along the ground;
(f) means securing said wheel to said mobile means; and
(g) first and second switching means operatively associated with said wheel and operatively connected to said coil to alternately establish magnetic fields of a first magnetic polarity and second opposite magnetic polarity respectively in said coil at periodic points in said movement to impress alternating magnetic patterns in said road material.

7. Apparatus according to claim 6 wherein said first and second switching means include means for limiting the length of time said coil remains energized after being energized.

8. Apparatus according to claim 7 wherein said limiting means includes first and second switches and first and second amplifiers capacitively coupled to said switch means.

9. Apparatus of claim 6 including means for optionally disabling said second switching means whereby one of two different magnetic patterns can be impressed in said material.

10. Apparatus of claim 6 wherein said wheel has frictional contact with the ground when rotating in response to said movement.

11. Apparatus of claim 6 wherein said first and second switching means are alternated activated at 90 degree intervals of the rotational movement of said wheel.

12. Apparatus of claim 6 wherein said attaching means includes a pivot arm extending from said mobile means at one end and attached to said wheel toward the other end, so that the wheel can be pivoted out of ground contact to disable the impressing apparatus.

13. Apparatus for impressing a magnetic pattern into magnetizable road surface material deposited by road surface laying equipment and for use in control of vehicles passing thereover, comprising:
(a) an electromagnetic coil;
(b) pole pieces running through said coil and extending therefrom;
(c) an arm attached to said equipment for positioning said coil proximate said material;
(d) a wheel for rotating in response to movement of said equipment along the ground;
(e) a mounting member attached to said wheel at one end and said equipment at the other end of said member, said first member being pivotable at said other end from an operative position in which the wheel engages the ground to a vertical storage position;
(f) a first magnet attached to said wheel;
(g) a second magnet attached to said wheel at a point opposite said first magnet 180 degrees around said wheel;
(h) a first magnetically responsive switch affixed to said mounting member adjacent the wheel such that said first switch is activated when said magnets pass said first switch as said wheel revolves;
(i) a second magnetically responsive switch and means affixing it to said mounting member adjacent the wheel such that said second switch is activated when said magnets pass said second switch as said wheel revolves, said second switch being positioned 90 degrees from said first switch with respect to said wheel;
(j) first circuit means responsive to the activation of said first switch for energizing said coil to produce a magnetic field of first polarity, whereby a magnetic zone having a first polarity is impressed in said material;
(k) second circuit means responsive to the activation of said second switch for energizing said coil to produce a magnetic field of polarity opposite to said first polarity, whereby a magnetic zone having said opposite polarity is impressed in said material; and
(l) third circuit means for optionally disabling one of said circuit means whereby said pattern impressed in said road surface may be altered.

14. Apparatus according to claim 13 wherein said first and second circuit means include means for limiting the length of time said coil remains energized after said switches are activated.

15. Apparatus according to claim 14 wherein said limiting means includes amplifier means which are capacitively coupled to said switches.

16. Apparatus according to claim 15 wherein said length of time is determined by the time constant of capacitive coupling.

17. Apparatus according to claim 14 wherein said coil is energized after said switches have first closed and then opened.

18. Apparatus according to claim 14 wherein each of said first and second circuit means includes an amplifier having an input, a capacitor connected between said input and the respective one of said first and second switches, a resistor connected between said input and signal ground, a diode connected in parallel with said resistor, and a bias resistor connected between said first switch and a source of power, whereby said length of time is determined by the time constant of said resistor and capacitor.

* * * * *